United States Patent Office 3,395,329
Patented July 30, 1968

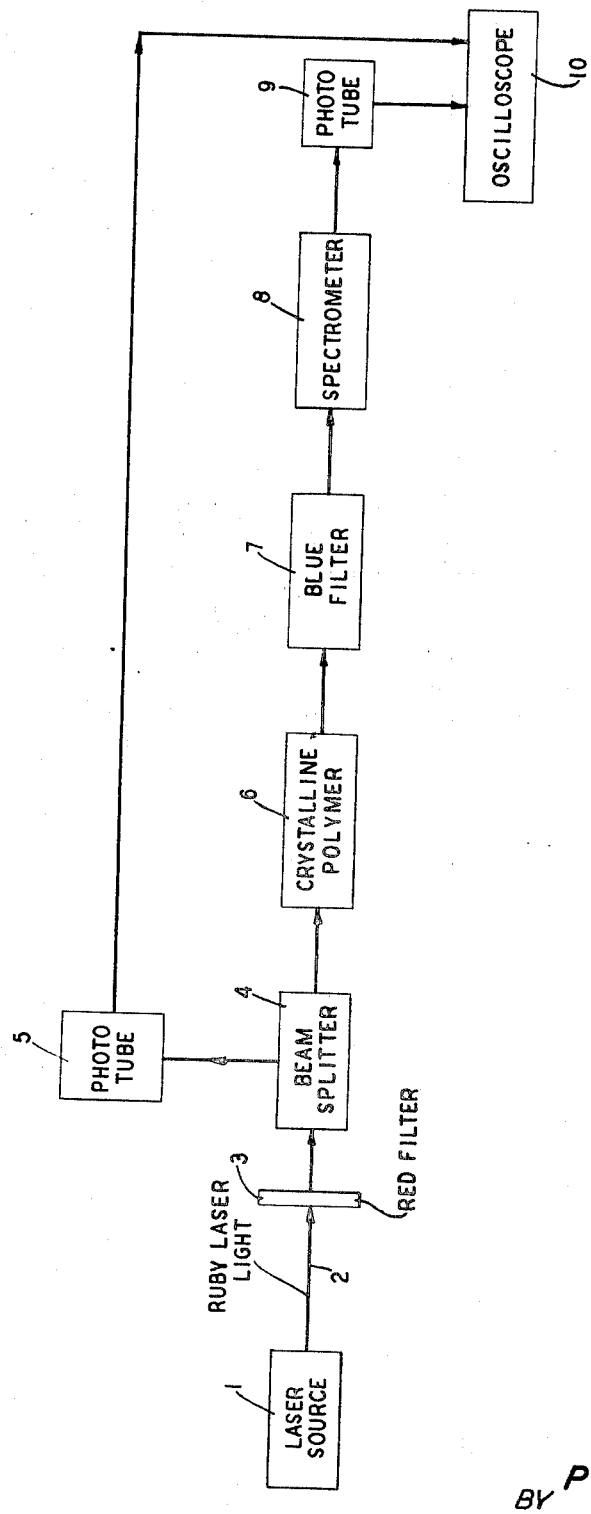

3,395,329
HARMONIC GENERATING CRYSTALLINE POLYMERS AND DEVICES USING SAME
Peter M. Rentzepis, Millington, N.J., assignor to Bell Telephone Laboratories, Incorporated, Murray Hill, N.J., a corporation of New York
Filed Aug. 4, 1967, Ser. No. 658,380
9 Claims. (Cl. 321—69)

ABSTRACT OF THE DISCLOSURE

Second harmonic generation is found in crystalline polymers not dependent upon the attainment of large crystal size for the discovered effect. The crystalline polymers are transparent to a broad range of incident laser frequencies and are useful in providing frequencies of coherent radiation other than those obtainable directly from present lasers.

This invention relates to the production of harmonic frequencies of laser radiation, and more particularly to harmonic generating crystalline polymers and devices incorporating them.

Background of the invention

With the advent of the laser it became possible to provide coherent light for many uses. As the laser is applied to more and more diverse uses, the need grows for greater variety in the laser's output characteristics. At present, the several lasers generally available are capable of yielding coherent light only at certain particular frequencies in the visible and near visible region of the spectrum. To obtain coherent light at other frequencies, frequency doubling or second harmonic generation is used. Basically, this entails passing the coherent energy of the laser source through an appropriate medium in which a second harmonic energy wave is generated, the second harmonic being of twice the frequency of the incident or "fundamental" frequency. In this way coherent light of twice the fundamental frequency is obtained. Third harmonics can also be produced in this manner. As used herein, the term "harmonic" can include second, third and even higher harmonics of some fundamental frequency.

At present there are several known single crystal materials which are used as second harmonic generating mediums. In general, the crystals should be large. However, as is well known, the manufacture of large single crystals is often a difficult and expensive procedure requiring very pure materials and highly exacting techniques. Indeed, in some instances the practical limit on single crystal size is of the order of a few centimeters in length.

Moreover, many of the presently known harmonic generating mediums are absorbing throughout a broad enough frequency range so as to be limited too severely in potential applications. The efficiency and versatility of harmonic generating materials depend upon the degree of transparency to the fundamental frequency as well as upon the material's transparency to the harmonic it is capable of generating.

Summary of the invention

The present invention is grounded on the discovery that certain polymeric materials can be made to exhibit harmonic generation. Broadly, the materials of interest are organic polymers which have been made crystalline to some degree, and which are highly transparent throughout the visible and near-ultra violet range.

Moreover, the crystalline polymers are inexpensive require no special chemical treatment and may be given the requisite degree of crystallinity by a simple inexpensive technique which is capable of yielding the requisite properties in a polymer of almost any size.

Brief description of the drawing

The drawing is a diagrammatic presentation of a suitable arrangement for demonstrating the harmonic generating properties of the crystalline polymers of the invention.

Detailed description

Harmonic generating materials of the single crystal type show well defined structures upon X-ray diffraction investigation. In contrast, the crystalline polymeric materials of this invention exhibit an ordered atomic arrangement only over relatively small dimensions and they in no way approach a state of crystallinity equivalent to that of the single crystals. The term "crystalline polymer" when used in this disclosure has reference to a polymeric material which has some local ordering of its polymer chains and in which the local ordered portions are either small single polymer crystals or behave in some respects as though they were small crystals. The term polymeric material includes materials with molecular weights of 50,000 and higher.

Exemplary of the broad class of crystalline polymers of the invention are polyethylene, poly-(vinylchloride), polypropylene, polystyrene and poly-(propylene oxide). The degree to which crystalline polymers can exhibit harmonic generation is determined by the state of total crystallinity of the polymer, that is by the total number of crystalline areas in the path of the energy beam. Thus any polymer which can be given the requisite state of total crystallinity and which is transparent to the fundamental and generated energies can be utilized in accordance with this invention.

This degree of crystallinity can be measured by several known techniques. One method utilizes the decrease in solubility of the polymers with increase in their crystallinity. Another technique employs X-ray diffraction analysis. Yet another procedure relies on the greater infrared absorption of the crystalline polymers over that of amorphous materials. Still another method is based on the higher density of the crystalline polymer over the amorphous. Accepted techniques for the estimation of polymer crystallinity by X-ray and infra-red methods are disclosed in "X-Ray and Infra-Red Studies on the Extent of Crystallization of Polymers," J. B. Nichols, Journal of Applied Physics, 25, 7, page 840 (1954).

The polymers of the invention exhibit harmonic generation provided they are at least partially crystalline. Of course, the lesser the extent of crystallinity, the lower the intensity of the harmonic output. Ultimately, the minimum crystallinity acceptable is dependent upon the sensitivity of the output sensing device employed and the use to be made of the output. In practice, a minimum of 10% total crystallinity is preferred, as determined, for example, by infra-red methods.

The polymers are usually supplied in the form of pellets or powder. An example of a procedure for obtaining high crystallinity in the bulk of a polymer comprises the steps of melting the original material and then allowing it to cool to rom temperature at a slow rate. It is well known that the rate of cooling is the determining factor and that the highest crystalline content is achieved by the slowest cooling rate.

While output intensity varies with degree of crystallinity, it has been found that the visible and ultraviolet light transmission efficiencies do not. The polymers of the invention offer excellent transmission for the output beams and harmonics of the ruby and neodymium lasers. This can be seen from Table I which also compares the transmission characteristics of the polymers to that of single crystals of lithium niobate and potassium dehydrogen phosphate (KDP).

anomalous index of refraction such that the frequencies of interest have the same index. The particular additive

TABLE I

| Crystalline Polymer or Single Crystal | Wavelength A. | | | | |
|---|---|---|---|---|---|
| | Ruby 6943 | | Neodymium 10,600 | | |
| | 2nd harmonic | 3rd harmonic | | | |
| | 6,943 | 3,472 | 2,314 | 10,600 | 5,300 |
| Percent Transmission: | | | | | |
| Polyethylene | 100 | 100 | 100 | 100 | 100 |
| Polyvinyl chloride | 100 | 100 | 10 | 100 | 100 |
| Polystyrene | 100 | 100 | 5 | 100 | 100 |
| Polypropylene | 100 | 100 | 60 | 100 | 100 |
| LiNbO$_3$ | 90 | 2 | 0 | 100 | 75 |
| KDP | 100 | 100 | 90 | 100 | 100 |

The drawing depicts a suitable arrangement for demonstrating the harmonic generating properties of the crystalline polymers of the invention. Ruby laser light 2, from laser source 1, passes through a red filter 3 to remove background radiation and then through a material 4 such as calcite or other suitable material, to effect beam splitting. One portion of the split beam is sensed by phototube 5 and utilized to energize oscilloscope 10, while the remaining portion impinges on crystalline polymer 6. The harmonic produced tends toward the blue region of the spectrum and separation of the generated beam from the incident beam is accomplished by passing the output beam through blue filter 7, which may be, for example, a 1 molar solution of copper sulfate. On exiting from filter 7, the beam is scanned by spectrometer 8 which selects the generated harmonic which is then sensed by phototube 9 and utilized to energize oscilloscope 10. The intensity of the generated harmonic relative to the initial laser light source can be observed on oscilloscope 10.

EXAMPLE I

In an arrangement essentially that depicted in the drawing, a 75% crystalline polyethylene sample weighing approximately .5 gram and having a density of approximately 0.96 gram per cc. and a molecular weight of 450,000, was utilized in higher harmonic generating experiment. The light source was a ruby laser at 6943 A. The second harmonic of ruby at 3472 A and the third harmonic at 2314 A were produced at efficiencies of $10^{-4}$ and $10^{-7}$, respectively.

The experiment of Example I was repeated with polyethylene, poly-(vinylchloride), polypropylene, polystyrene and poly-(propylene oxide) samples of 10 to 80 percent crystallinity, with similar results.

Of course, phase matching is desirable so that the fundamental and generated energies continuously interact to reinforce one another. Since the refractive index of the transmitting medium is frequency dependent, the length over which both frequencies will be matched is limited. This length can be increased by the incorporation of a suitable additive which is capable of providing substantially the same index of refraction for both frequencies of interest. The additive must have an absorption peak between the fundamental and generated harmonic of interest, and as a consequence, provide an anomalous index of refraction such that the frequencies of interest have the same index. The particular additive to be used in a particular crystalline system depends upon the frequency dependence of the refractive index for the system, but trans-carotene is among those that can be employed.

The invention has been described with reference to only a limited number of embodiments but it is intended that variations which basically rely on the teachings of the invention are to be included within the scope of the appended claims.

What is claimed is:

1. A harmonic generator comprising in combination, laser means for producing a coherent energy beam, means for directing said beam through a harmonic generating medium consisting essentially of a crystalline polymer, and means for utilizing the harmonic energy thereby produced.

2. The harmonic generator of claim 1 wherein said crystalline polymer is at least 10% crystalline, and said means for utilizing the harmonic comprises a filter which is transparent essentially only to said harmonic energy.

3. The harmonic generator of claim 2 wherein said crystalline polymer consists essentially of polyethylene.

4. The harmonic generator of claim 2 wherein said crystalline polymer consists essentially of poly-(vinylchloride).

5. The harmonic generator of claim 2 wherein said crystalline polymer consists essentially of polypropylene.

6. The harmonic generator of claim 2 wherein said crystalline polymer consists essentially of polystyrene.

7. The harmonic generator of claim 2 wherein said crystalline polymer consists essentially of poly-(propylene oxide).

8. The harmonic generator of claim 2 wherein said crystalline polymer includes an additive which so affects the index of refraction thereof that the indices for said coherent and said harmonic energies are substantially the same.

9. The harmonic generator of claim 3 wherein said additive is trans-carotene.

No references cited.

ROY LAKE, *Primary Examiner.*

DARWIN R. HOSTETTER, *Assistant Examiner.*